Figure 1:
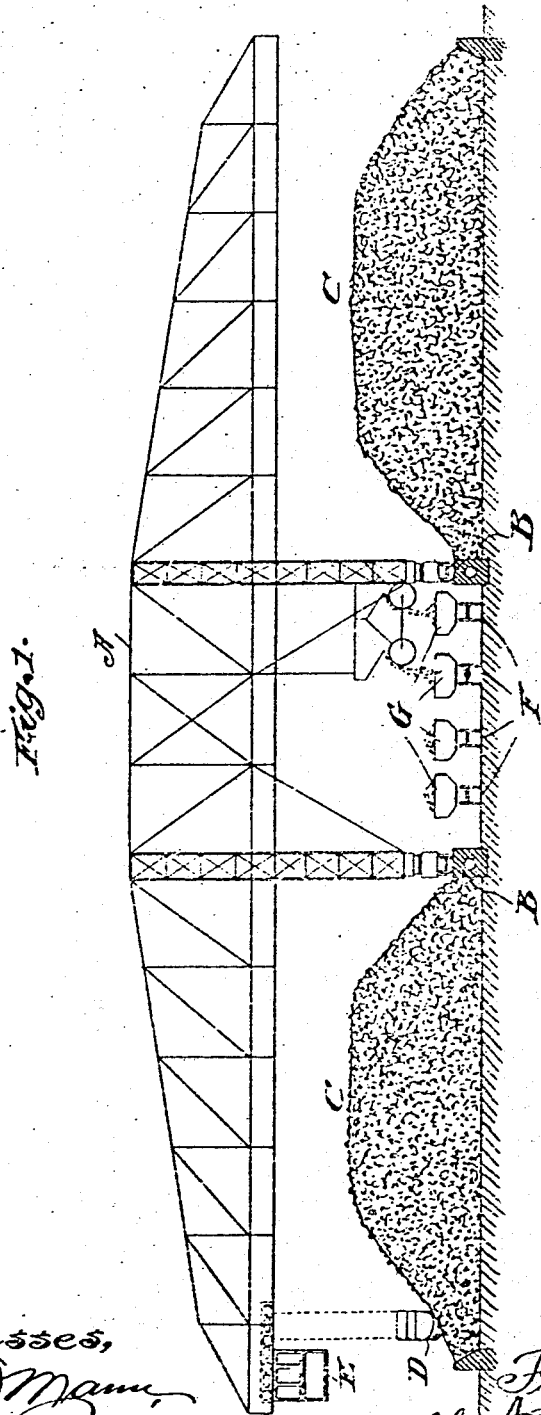

No. 768,992. Patented August 30, 1904.

UNITED STATES PATENT OFFICE.

FRANK K. HOOVER AND ARTHUR J. MASON, OF CHICAGO, ILLINOIS.

DEVICE FOR RAPID AND ACCURATE LOADING OF RAILROAD-CARS, &c.

SPECIFICATION forming part of Letters Patent No. 768,992, dated August 30, 1904.

Application filed February 17, 1903. Serial No. 143,757. (No model.)

*To all whom it may concern:*

Be it known that we, FRANK K. HOOVER and ARTHUR J. MASON, citizens of the United States, residing at Chicago, in the county of Cook and State of Illinois, have invented certain new and useful Improvements in Devices for Obtaining Rapid and Accurate Loading of Railroad-Cars and the Like, of which the following is a specification.

Our invention relates to a new and improved means for obtaining both a rapid and an accurate loading of railroad-cars and other freight-carriers.

Railroad-cars and like carriers adapted for the transportation of coal, ore, earth, and similar loose and more or less granular material are at the present day extensively loaded by means of self-loading grabs or buckets of large capacity suspended from bridges, cranes, and like overhead supports, the grab picking up a load of material from a stock-pile or an excavation and traveling with it to a position directly over the car, whence its load is discharged into the latter. This manner of loading is uneconomical in that the operator in order to avoid overloading is frequently required as the loading of the car nears completion to make trips with the loading grab or bucket one-half or one-quarter full. Furthermore, during the intervals between the withdrawal of a loaded car and the introduction of an empty car to its place the loading-grab is required to be partially or entirely idle.

A leading object of our invention, therefore, is to avoid these objections through the employment of a temporary receptacle capable of holding, preferably, several car-loads between the loading-grab and the car or other carrier to be loaded, which receptacle permits the grab to remain continuously at work, while in connection with said receptacle means are provided for permitting or effecting the withdrawal therefrom of desired and regulable amounts of material into the cars placed therebeneath. It results from such an arrangement not only that the loading-grab may be kept continously at work replenishing the temporary receptacle, but the individual cars may themselves be loaded much more rapidly by a continuous discharge of material from the temporary receptacle than where they are compelled to await the service of a grab or bucket which is itself compelled to travel a greater or less distance for its load.

Railroads also require that their freight-cars shall be loaded to an extent between a certain maximum and minimum weight, depending on the strength and capacity of each car, in order that the maximum efficiency and economy may be served in the transportation of freight. Obviously it is uneconomical to draw cars loaded appreciably below their minimum carrying capacity, and it is likewise dangerous to attempt the transportation of cars loaded appreciably beyond their maximum tested capacity. For these reasons freight-carriers endeavor to secure a loading of cars within certain specified minimum and maximum weights, according to the tested capacity of each car, and if the load exceeds the maximum or falls below the minimum much delay is incurred by reason of the necessary reloading or readjustment of the load before the car will be accepted for transportation. When the loading of cars is accomplished direct by self-loading grabs or buckets, such grabs or buckets frequently taking up and depositing as high as fifteen tons on each trip, the restrictions imposed by the railroads as to the maximum and minimum limits of the weight of the load hamper the work of loading. For instance, it will be seen that when the grab is delivering direct to the cars the operator must constantly bear in mind the capacity of the particular car then being loaded and, as above mentioned, must frequently take up half or quarter loads, so as not to overload the car. Even with long experience it is very difficult to estimate or guess with any fair degree of accuracy when the car has received a proper and sufficient load, since the material varies greatly in specific gravity, and the form, dimensions, and capacity of different freight-cars also vary within a wide range.

Another important object of our present invention, therefore, is to obviate the conditions at present existing under which great care is required to be exercised in the loading of cars in order to avoid violation of the rules of the railroads and consequent delay in transportation and to provide a device whereby each car may be loaded in a proper manner to its maximum capacity.

To this end another salient and characteristic novel feature of our invention resides in supporting the aforesaid temporary receptacle by a scale mechanism which is preferably provided with an indicating dial and pointer, whereby the exact weights of the amounts drawn off from the temporary receptacle and delivered to the cars may be ascertained at a glance as the material is so delivered, and in that form of our invention which we have selected to illustrate the same we have shown the temporary receptacle as thus provided with a scale mechanism, although it is to be understood that our invention is not limited to the inclusion therein of such scale mechanism except to the extent indicated in certain of the appended claims.

Our invention has been designed more particularly for use in connection with the handling of iron and other ores, although it is of equal advantage in connection with the handling of coal, broken stone, earth, and any loose and more or less granular material.

In the accompanying drawings we have illustrated our invention as embodied in an ore-handling plant, wherein—

Figure 2:
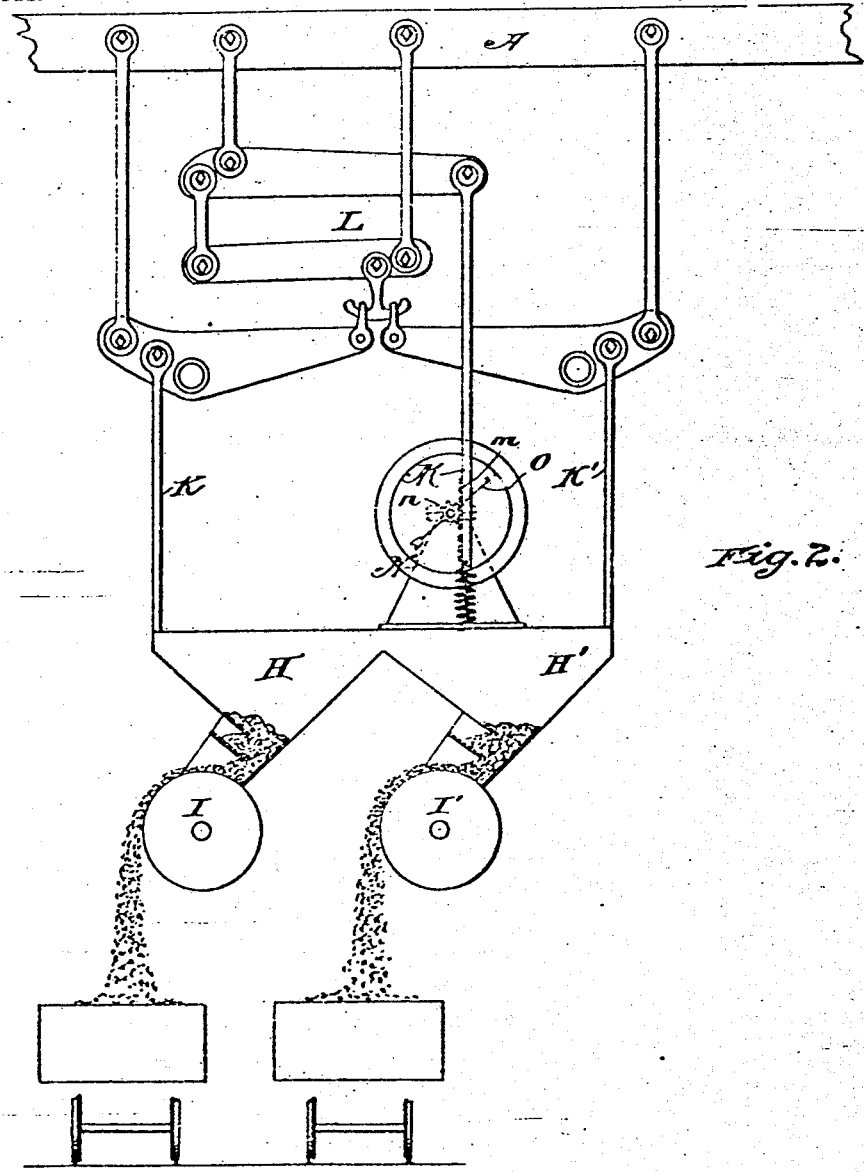

Figure 1 shows in side elevation a complete plant for transferring the ore from stock-piles to railroad-cars, and Fig. 2 is a detail side elevational view illustrating the temporary receptacle and means whereby the weight of said receptacles and their contents is readily ascertainable for the purpose of determining the exact weights of material delivered therefrom to the railroad-cars or other carriers.

Referring to the drawings, A designates a truss supported upon tracks B B, whereby it has capacity for lateral travel in order to serve stock-piles C underlying the end portions thereof and lying alongside the tracks B throughout a part or the entire extent of the latter.

D designates a self-loading grab or bucket which is operated by suitable mechanism from a traveling car E, mounted on the truss, which renders the bucket capable of either taking or delivering a load at any point between the ends of the truss A. Between the tracks B B, supporting the traveling truss, are arranged a series of railroad-tracks F, on which may travel trains of freight-cars G.

H and H' designate twin compartments of a suspended scale-hopper, the means of supporting which is shown in Fig. 2 and will be hereinafter more particularly described. The hoppers H H' are preferably of the roller type similar to those disclosed in Letters Patent No. 702,731, granted to us on the 17th day of June, 1902, being equipped with delivery-rollers I and I', respectively, for the regular and uniform delivery of the material as the rollers are turned, although so far as the broad features of our invention are concerned any other type of scale-supported hopper may be employed in this relation. In the arrangement shown the twin compartments H H' are arranged to deliver material respectively to a pair of the cars G G, standing side by side on adjacent tracks. Obviously a single hopper delivering to a single car or a group of hoppers corresponding in number with the number of cars disposed side by side on the several tracks lying beneath the truss might be employed within the spirit of our invention.

The system of scale mechanism where such is employed for supporting the hoppers and their contents might be of any ordinary construction; but for maximum convenience to the operator in loading the cars we prefer to indicate the weight of the hoppers and their contained load in a manner similar to that described in our application for Letters Patent on a scale-car, Serial No. 132,615, filed November 24, 1902, by means of a dial and an index-hand in full view of the operator. As illustrating one form of scale mechanism which may be employed we have shown in Fig. 2 the hoppers H H' as suspended by means of rods K K' from a system of lever-and-link scale mechanism, designated as an entirety by L and itself suspended from the main longitudinal sills of the truss A, the final lever-arm of this scale mechanism being connected by a rod M, having a toothed rack $m$ at its lower end with the pinion $n$ of an indicating-dial N, having a pointer O.

In the operation of the apparatus when it is desired to load a car the same is drawn to a position directly beneath one of the discharge-rollers of the hoppers or buckets which have previously been sufficiently filled, and the operator first notes the reading on the dial, which indicates the total weight of the hopper and its contents. Knowing the proper weight of material to be loaded into the car, he then starts in operation the discharging-roller, whereby the material is caused to flow in a substantially steady and uniform stream into the car, continuing the operation of the roller until the backward movement of the dial-pointer indicates that the proper weight of material has been withdrawn. He then interrupts the operation of the discharging-roller until the loaded car has been withdrawn and replaced by an empty car to be filled, whereupon the operation is repeated. During the intervals between the loading of successive cars the grab D may be continuously at work, and in view of the fact that the capacity of each hopper will ordinarily be several times the capacity of a car no necessity exists for introducing the material to the hoppers in fractional quantities of a grab-load, and hence the grab D may be efficiently and economically operated to its fullest capacity at each trip.

From the foregoing it will be seen that by our invention we provide a simple and easily-manipulated apparatus for effecting the rapid and continuous loading of cars and other carriers which in the preferred form of our invention herein illustrated and described also insures an accurate loading of the cars or other carriers not dependent upon the mere judgment or skill of the operator.

Believing ourselves to be the first to employ a temporary receptacle, as also a temporary scale-supported receptacle, between the self-loading bucket and the cars, whereby the advantages and benefits of rapid and exact loading are obtained, as hereinabove set forth, we do not limit our invention in any respect to the particular forms of temporary receptacle or scale-support therefor herein shown and described, since these may obviously be varied as to form and structure as may best suit different circumstances and environments without departing from the principle and spirit of our invention.

We claim—

1. In an apparatus for loading railway-cars and other carriers, a hopper disposed above said cars or carriers, in combination with a scale supporting said hopper and adapted to register the weight of the entire contents of the hopper and of any portion thereof, and means controlling the throat of the hopper through the manipulation of which any predetermined portion of the contents as indicated by the scale may be withdrawn, substantially as described.

2. In an apparatus for loading railway-cars and other carriers, a conveyer truss or bridge commanding the material to be transported and a railway-track or other highway, in combination with a scale-supported hopper suspended from said truss above said cars or other carriers, a self-loading grab or bucket operating on said truss to deliver material to said hopper, and means controlling the throat of the hopper for effecting the discharge of material in regulable quantities from said hopper to said cars or other carriers, substantially as described.

3. In an apparatus for loading railway-cars and other carriers, a laterally-traveling conveyer truss or bridge commanding a stockpile and a railway-track or other highway, in combination with a scale-supported hopper suspended from said truss above the cars or other carriers, a self-loading grab or bucket operating on said truss to deliver material to said hopper, and means controlling the throat of the hopper for effecting the discharge of material in regulable quantities from said hopper to said cars or other carriers, substantially as described.

4. In an apparatus for loading railway-cars and other carriers, a laterally-traveling conveyer truss or bridge commanding a stock-pile and a railway-track or other highway, in combination with a scale-supported hopper suspended from said truss above the cars or other carriers, a self-loading grab or bucket operating on said truss to deliver material to said hopper, means controlling the throat of the hopper for effecting the discharge of material in measurable weights from said hopper to said cars or other carriers, and an indicator connected with the scale and serving to disclose the weight of material withdrawn from the hopper, substantially as described.

5. In an apparatus for the purpose described, the combination with a laterally-movable conveyer truss or bridge commanding the material to be transported and an underlying railway-track, of a self-loading grab or bucket suspended from said conveyer-truss, means for operating the same from end to end of said truss, and a hopper suspended from said truss capable of serving as a temporary storage-receptacle for material delivered by the grab and provided with regulable discharging means for effecting a controllable and substantially uniform flow of the material from said hopper to railway-cars therebeneath, substantially as described.

6. In an apparatus for the purpose described, the combination with a conveyer truss or bridge commanding a stock of material to be transported, and a self-loading bucket operating on the same, of a hopper adapted to be filled by said bucket, said hopper being provided with means to effect the discharge of any desired portion of its contents into cars or other carriers therebeneath, substantially as described.

FRANK K. HOOVER.
ARTHUR J. MASON.

Witnesses:
SAMUEL N. POND,
FREDERICK C. GOODWIN.